(12) United States Patent
Haninger et al.

(10) Patent No.: US 6,216,325 B1
(45) Date of Patent: *Apr. 17, 2001

(54) MACHINING CENTER WITH LOADING DEVICE HAVING A PIVOT ARM

(75) Inventors: Rudolf Haninger, Seitingen; Hans-Henning Winkler, Tuttlingen, both of (DE)

(73) Assignee: Chiron - Werke GmbH & Co. KG

( * ) Notice: Subject to any disclaimer, the term of this patent is extended or adjusted under 35 U.S.C. 154(b) by 0 days.

This patent is subject to a terminal disclaimer.

(21) Appl. No.: 09/183,241

(22) Filed: Oct. 30, 1998

(30) Foreign Application Priority Data

Nov. 1, 1997 (DE) ................................. 197 48 336

(51) Int. Cl.$^7$ ..................................................... B21B 15/00
(52) U.S. Cl. ........................... 29/33 P; 198/345; 409/163; 483/14; 483/15; 82/124; 414/225
(58) Field of Search ............................. 29/33 P; 198/345; 409/163, 164, 202, 212, 224; 483/14, 15; 82/124; 414/225

(56) References Cited

U.S. PATENT DOCUMENTS

| | | | |
|---|---|---|---|
| 4,317,394 | * 3/1982 | Link et al. | 82/2.5 |
| 4,429,838 | * 2/1984 | Lenk et al. | 242/46.4 |
| 4,976,025 | * 12/1990 | Aldridge, Jr et al. | 29/563 |

* cited by examiner

Primary Examiner—S. Thomas Hughes
Assistant Examiner—John C. Hong
(74) Attorney, Agent, or Firm—Cummings & Lockwood

(57) ABSTRACT

A machining center has a number of machine tools which each have a working space for machining workpieces, a clamping station in which workpieces to be machined are clamped into workpiece holders, and a loading device 26 which transports the workpiece holders between the clamping station and the working space of at least one machine tool, and in order to transport the workpiece holder has a pivot arm 43 which is swung in as the loading device 26 moves, and which for workpiece changing is pivoted at least partially about a pivot axis 93 into the working space or to the clamping station. The workpiece holder has a fixture 51 for positionally accurate receiving of a workpiece, which has at its two end faces holding parts 56, 57 via which it is held in the clamping station and in the working space. The loading device 26 has a further pivot arm 43' arranged parallel to the pivot arm 43, the pivot arms 43, 43' grasping the fixture 51 at the end faces and receiving it between them for transport.

19 Claims, 12 Drawing Sheets

MACHINING CENTER WITH LOADING DEVICE HAVING A PIVOT ARM

BACKGROUND OF THE INVENTION

1. Field of the Invention

The present invention relates to a machining center having a number of machine tools which each have a working space for machining workpieces, a clamping station in which workpieces to be machined are clamped into workpiece holders, and a loading device which transports the workpiece holders between the clamping station and the working space of at least one machine tool, and in order to transport the workpiece holder has a pivot arm which pivots in as the loading device moves, and which for workpiece changing is pivoted about a pivot axis into the working space or to the clamping station.

2. Related Prior Art

A machining center of this kind is known from DE 195 16 849 A1.

In the known machining center, a certain number of machine tools are arranged next to one another, a loading/unloading station in which a clamping station is located being provided next to that row of machine tools. In the clamping station, workpieces are inserted into workpiece holders which are held by a pivot arm of a loading device.

After the workpiece holder has been loaded with a new workpiece, the pivot arm is pivoted in and the loading device travels to one of the machine tools, where the pivot arm pivots back out and the workpiece holder is clamped in a fixture holder which is provided in the working space of that machine tool. After machining of the workpiece, the workpiece holder is transported either to another machine tool for a further machining operation or back to the loading/unloading station where the machine workpiece is replaced with a workpiece that is yet to be machined.

The pivot arm of the loading device grasps the workpiece holder on one side, the latter in turn grasping the workpiece to be machined on one side. The fixture holder in the working spaces also grasps the workpiece holder on one side; a buttress can selectably be provided so that clamped workpieces can be better centered.

It has been found that with the known machining center, the handling of the workpieces and workpiece holders is disadvantageous particularly when bulky and/or heavy workpieces are to be machined. On the one hand, surprisingly, the machining accuracy and the reproducibility of the machining operation decrease when heavier and/or more bulky workpieces are used. These disadvantages can be partially eliminated or at least diminished by performing workpiece handling in general at lower velocities. This means, however, that in order to achieve high machining accuracy and reproducibility in the machining of heavy and/or bulky workpieces, the workpiece-to-workpiece time is reduced with the known machining center, which of course is disadvantageous.

SUMMARY OF THE INVENTION

In view of the above, it is an object of the present invention to improve the machining center mentioned at the outset in such a way that enhanced machining speed and machining accuracy are achieved by means of a simple design, in particular with heavy and/or bulky workpieces.

In the case of the machining center mentioned at the outset, this object is achieved in that the workpiece holder comprises a fixture for positionally accurate receiving of a workpiece, which has at its two end faces holding parts via which it is held in the clamping station and in the working space; that the loading device has a further pivot arm arranged parallel to the pivot arm; and that the pivot arms grasp the fixture at the end faces and receive it between them for transport.

The object underlying the invention is completely achieved thereby.

Specifically, the inventors of the present application have recognized that the accuracy gained by slowing down workpiece handling with heavy workpieces results from the fact that the workpiece holders no longer tilt or tend to vibrate, and because of the slower handling, any vibrations can decay before the workpiece holder is clamped in. According to the present invention provision is now made by way of the two-armed pivot arm, which in a manner of speaking grasps the fixture at both end faces between itself, for tilting of the mechanism to be impossible either during rapid transport or during rapid pivoting out or in at the clamping station and working space; the fixture moreover does not vibrate, so that more rapid movement becomes possible. The workpiece-to-workpiece time can in this fashion be greatly enhanced by way of physically simple actions, without reducing machining accuracy, when heavy workpieces are being machined.

It is preferred in this context if a double gripper which grips the fixture at each holding part is rotatably mounted on each pivot arm, the holding parts preferably comprising hollow shaft tapers and the double grippers grasping the hollow shaft tapers at gripper grooves; also preferably, one fixed and one movable buttress being provided in the clamping station and in each working space, each having a hollow shaft taper receptacle in order to clamp the fixture between them.

This feature is advantageous in terms of design: hollow shaft tapers are commonly known, for example, from tool changing mechanisms, where their tapers are inserted into tool receptacles on spindles, while gripper hands of tool changers grasp onto their gripper grooves in order to transport the hollow shaft tapers back and forth between their working position in the receptacle in the spindle and a magazine position. The hollow shaft tapers (hereinafter "HSKs") are also used in similar fashion here: the fixture is braced between the buttresses via the HSK and HSK receptacle, and gripper hands of the pivot arm can grasp onto the gripper grooves in order to transport the fixture. This simple design ensures that the fixtures can be transported without tilting or jamming, so that they can be moved quickly without causing vibrations which must be allowed to decay before the fixtures are clamped in. These features thus enhance the machining speed and machining accuracy.

It is preferred, in this context, if the fixture has, at least at one end face, a positioner part oriented parallel to the hollow-shaft taper which, when the fixture is clamped in between the buttresses, is in engagement with a further positioner part on one of the buttresses.

The advantage here is that even more accurate positioning of the fixture results, since changes in the position of the fixture during transport by the pivot arm no longer have any effects, and the fixture is, so to speak, reoriented when clamped in the working space. This also enhances the machining accuracy.

It is preferred in general if the two double grippers are joined to one another via a rigid shaft, and if one of the double grippers is joined to a rotation motor, the two pivot arms preferably being driven via a shared pivot motor and, also preferably, a rotatably mounted coupling rod which extends parallel to the rigid shaft being arranged between the pivot motor and one of the pivot arms.

These features are advantageous in terms of design and also enhance both the machining accuracy and the machining speed. Because the pivot arm and the double gripper are now, so to speak, designed in double fashion and are doubly driven, tilting is now prevented even when a fixture is loaded with a heavy workpiece, so that it is unnecessary to wait for transient dissipation after pivoting in before the buttresses can clamp the fixture between them. Because of the double-sided drive, pivoting and rotation occur much more quickly than when the workpiece holder is held on one side, as is known from the prior art.

It is preferred in this context if the pivot motor is drivingly connected via a first toothed belt to a first gear joined to the one pivot arm, and via a second toothed belt to a second gear joined to the coupling rod, and if the coupling rod has a third gear which is drivingly joined, via a third toothed belt, to a fourth gear which is joined to the other pivot arm.

This feature is also advantageous in terms of design: the reason is that because of the even greater distances to be spanned by the toothed belts, the pivot motor and coupling rod can be arranged outside the pivot axis of the pivot arms, so that as the pivot arm pivots in and out, the fixture carried by the double grippers does not collide with the coupling rod. With the rigid shaft joining the two double grippers this is not possible in any case, since the double gripper selectably carries a respective fixture on each side of its rotation axis in which the rigid shaft is arranged; it pivots one fixture during rotation, or both fixtures during changing, about the shaft. The coupling rod, on the other hand, allows a driving connection of the two pivot arms outside the pivot axis.

It is further preferred if the rotation motor is arranged concentrically with the rotation axis, and is drivingly connected via a fourth toothed belt to a fifth gear that is joined to the one double gripper, the rotation motor preferably having a motor shaft which extends through the first gear and carries at its free end a sixth gear which is in engagement with the fourth toothed belt.

The advantage here is that the connection between the rotation motor and double gripper is maintained regardless of the pivot position of the pivot arm, pivot driving of the pivot arm being implemented in simple fashion because of the, so to speak, hollow first gear.

It is preferred in general if the fixture comprises self-locking clamping elements for clamping in the workpieces, a coupling module for supplying the clamping elements with fluidic energy, and a multiple coupling for transferring measurement signals which is selectably docked in the clamping station.

These features also allow a higher machining speed, since in the prior art the accuracy loss with heavier workpieces is attributable to the fact that these workpieces are not clamped in the clamping station in a sufficiently controlled fashion, and in the working space are not held securely enough in the workpiece holder. By way of the coupling module, the clamping elements are now supplied with fluidic energy both in the clamping station and in the working space, so that the workpieces can be held securely during both machining and positioning.

The coupling module moreover makes it possible to use self-locking clamping elements whose clamping force in the working space is enhanced by the fluidic energy and which can be actively opened in the clamping station. These self-locking clamping elements now hold the workpieces so securely during transportation between the clamping station and the working space that they can be moved and displaced very quickly without changing their position in the fixture.

This is because it has been found that in the prior art, machining inaccuracy results in particular from the fact that insufficient clamping forces are being applied in some cases, so that the workpieces can "slip" in the workpiece holders. The multiple coupling moreover makes possible controlled clamping of the workpieces in the clamping elements. This is because the multiple couplings can, for example, make pneumatic connections so that back-pressure meters or booster relays can be used to monitor stops, etc. which indicate accurate placement of the workpieces. This multiple coupling is required only in the clamping station, and is attached there only selectably. When the multiple coupling is open it is thus possible, both in the working space and in the clamping station, to rotate the fixture via a rotary distributor which comprises only the coupling module that is required for clamping the clamping elements. The large number of coupling elements required for the booster relays, etc. can be provided in the multiple coupling, the mating element of which is necessary only in the clamping station, resulting overall in design advantages for the new machining center.

It is further preferred if a cover for the multiple coupling is provided in order to protect its coupling elements from soiling in a working space, a handling system, which is preferably arranged on the loading device, preferably being provided for the cover.

The advantage here is that the coupling elements cannot become soiled, so that they do not need to be blown clean in the clamping station before coupling, which saves time and thus further increases the machining speed. If the cover is actuated via a handling system arranged on the loading device, this can be done during displacement of the loading device between the clamping station and a working space, so that no additional time period needs to be provided for this step in the workpiece-to-workpiece time.

Lastly, it is also preferred if there is arranged on one of the two buttresses a rotary distributor which comprises coupling elements associated with the coupling module, a further positioner part associated with a positioner part arranged on the fixture, and a further holding part associated with a holding part; there being preferably provided on one of the two buttresses a docking mechanism associated with the multiple coupling and having coupling elements, said docking mechanism being displaceable independently from the buttress in terms of opening and closing the multiple coupling.

The advantage with this feature is that the fixture can be pivoted both in the working space and in the clamping station for multi-sided machining or for cleaning, shear forces on the coupling elements being prevented by way of the positioner parts.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the drawings and will be explained in more detail in the description below. In the drawings:

FIG. 3 shows a section along line III—III of FIG. 1, with the loading device in position and the pivot arm swung in;

FIG. 7 shows a depiction like FIG. 6, but with the multiple coupling docked in;

DETAILED DESCRIPTION OF A PREFERRED EMBODIMENT

Figure 1:
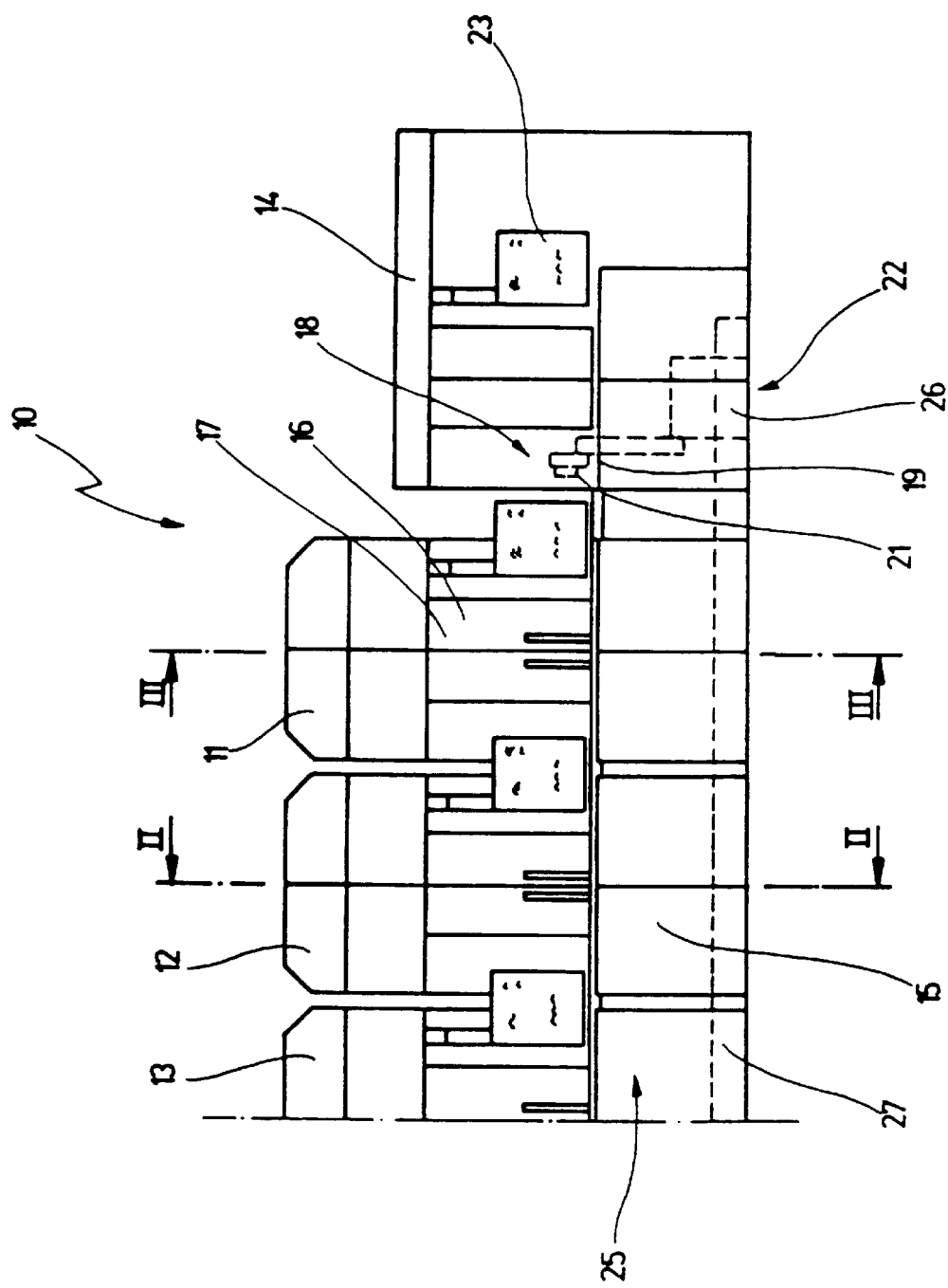
FIG. 1 shows a partial frontal view of the new machining center.

FIG. 1 shows, in a frontal view, a machining center 10 in which machine tools 11, 12, and 13 (merely indicated) are arranged next to one another. In addition to machine tools 11, 12, and 13, a loading/unloading station 14 is provided.

Machine tools 11, 12, 13 have an enclosure 15 which surrounds them completely and in which an operator door 16, through which an operator gains access to a working space 17, is provided for each machine tool 11, 12, 13. Retooling and service operations are performed for the individual machine tools 11, 12, 13 through this operator door 16.

A clamping station 18 (indicated merely schematically), in which individual workpiece holders 19 are equipped with workpieces 21 to be machined, is provided in loading/unloading station 14. Workpiece holders 19 equipped in this manner with workpieces 21 are transported by means of a loading mechanism 22 to the individual machine tools 11, 12, 13, and there inserted into the respective working space 17 and machined. Once machined, workpieces 21 are transported with their workpiece holders 19 out of working spaces 17 back to clamping station 18, where they are exchanged for new workpieces 21 to be machined.

It is further evident from FIG. 1 that an operating console 23, via which the usual operator inputs can be made, is provided at each machine tool 11, 12, 13 and at loading/unloading station 14.

With the new machining center 10 of FIG. 1, loading mechanism 22 is arranged in a loading space 25 which is located beneath working spaces 17 of machine tools 11, 12, 13 and preferably inside enclosure 15. In this loading space 25, a loading device 26 runs back and forth along a guide rail 27 and thereby transports workpiece holders 19, containing workpieces 21, between clamping station 18 and working spaces 17 or between individual working spaces 17 of different machine tools 11, 12, 13.

Figure 2:
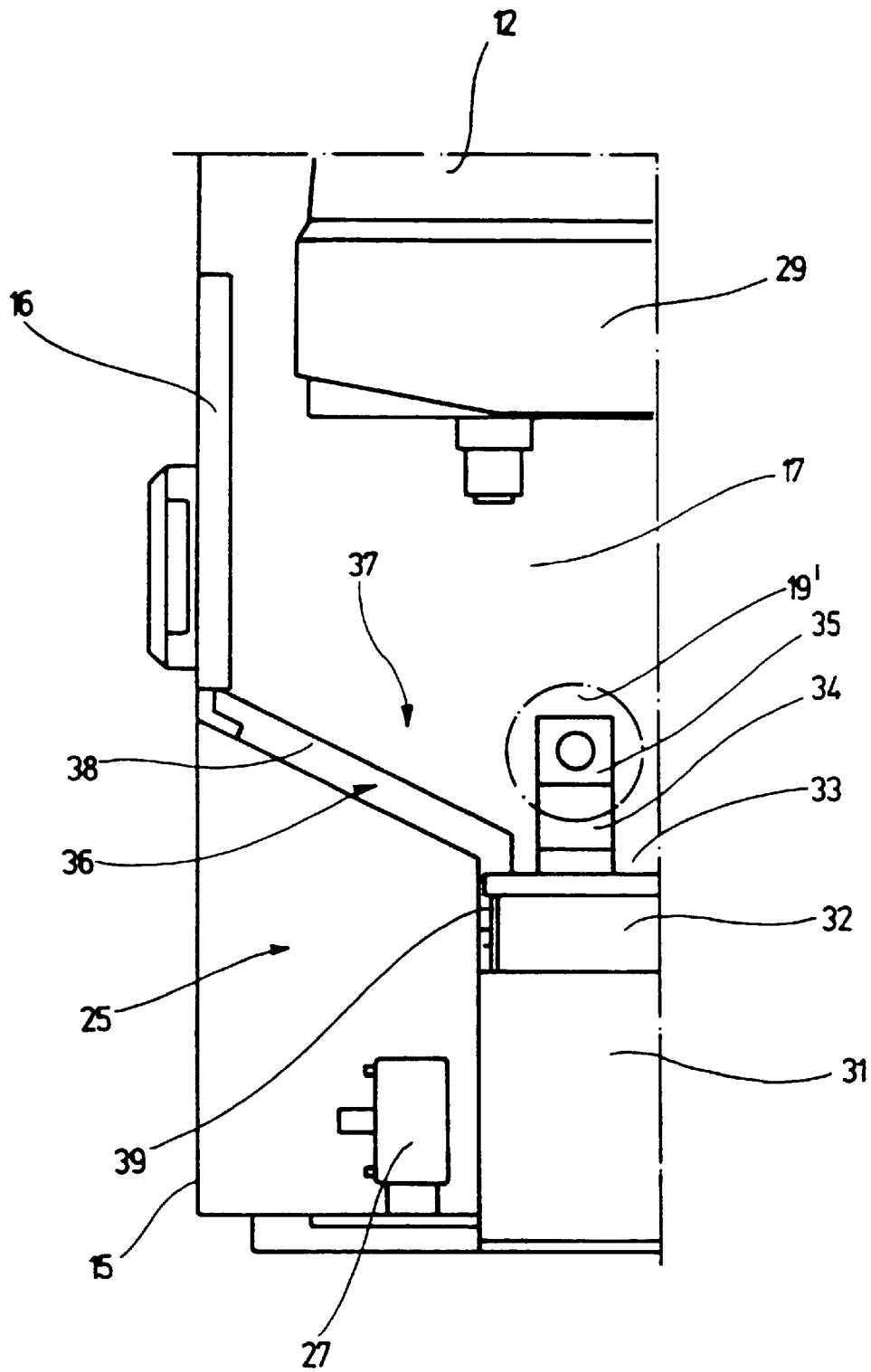
FIG. 2 shows a section through the machining center of FIG. 1 along line II—II, without the loading device in the loading space.

FIG. 2 shows, in a partial sectioned depiction along line II—II of FIG. 1, a cross section through machine tool 12, indicating a spindle head 29 which is provided for machining workpieces in working space 17.

Machine tool 12 comprises a machine base 31 on which is provided a schematically indicated workpiece table 32, which, so to speak, spans a working surface 33 in working space 17. Arranged on workpiece table 32 is a fixture holder 34 which, as a fixed buttress, is equipped to grasp workpiece holder 19 and hold it during machining with tools provided in spindle head 29. In FIG. 2, 19' designates a workpiece holder which holds an already machined workpiece, workpiece holder 19' being merely indicated by a circle.

Loading space 25 is connected to working space 17 through a loading opening 36. In this context, a cover 37 is provided which is closed while the workpieces are being machined with tools in working space 17, so that contaminants do not get into loading space 25.

Cover 37 is configured in two parts, and comprises a sliding cover 38 which faces upward in FIG. 2 and is inclined toward working surface 33, as well as a swing-out cover 39 which extends approximately perpendicular to working surface 33 and can be swung toward it. It is evident that sliding cover 38 overlaps swing-out cover 39, so that splashes of cutting fluid, flying workpiece chips, etc. also cannot pass through between sliding cover 38 and swing-out cover 39 into loading space 25.

Figure 3:
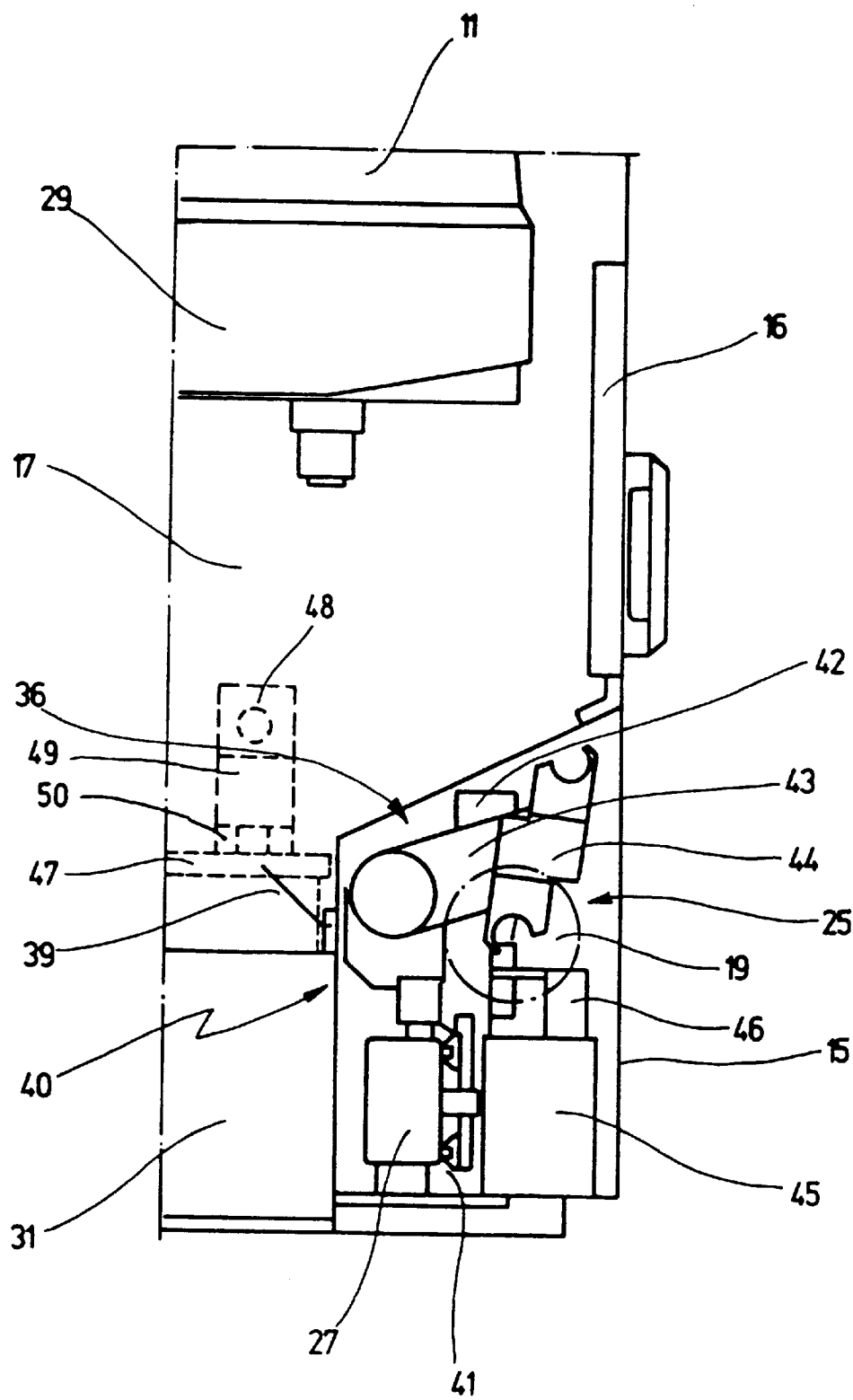

FIG. 3 shows, in a depiction similar to that of FIG. 2 but along line III—III of FIG. 1, the situation in which cover 37 is open and loading device 26 has been moved into the region beneath working space 17 of, in this case, machine tool 11.

This loading device 26 is, so to speak, a self-displacing workpiece changer 40 which has a drive unit 41 with motor 42, engaging on guide rail 27, which ensures in suitable fashion that loading device 26 can travel along guide rail 27 which is preferably profiled in cross section.

The displaceable workpiece changer 40 furthermore has a pivot arm 43 swingably attached thereto, which in FIG. 3 is swung in so that it is located in loading space 25. Arranged at the upper end of pivot arm 43 is a rotatable double gripper 44 which carries on its one hand a workpiece holder 19, while the other hand is still unoccupied.

Also evident from FIG. 3 is an ordinary trailing cable installation 45 which makes available electrical, pneumatic, and (if necessary) hydraulic connections 46 for loading device 26 and connects the latter via said connections 46 to the associated control unit/operator console 23.

Also evident from FIG. 3 is a workpiece table 47, arranged behind swing-out cover 39, which carries a movable buttress 48 that is displaceable on rails 50 by means of a motor 49 in order better to center workpiece holder 19.

Figure 4:
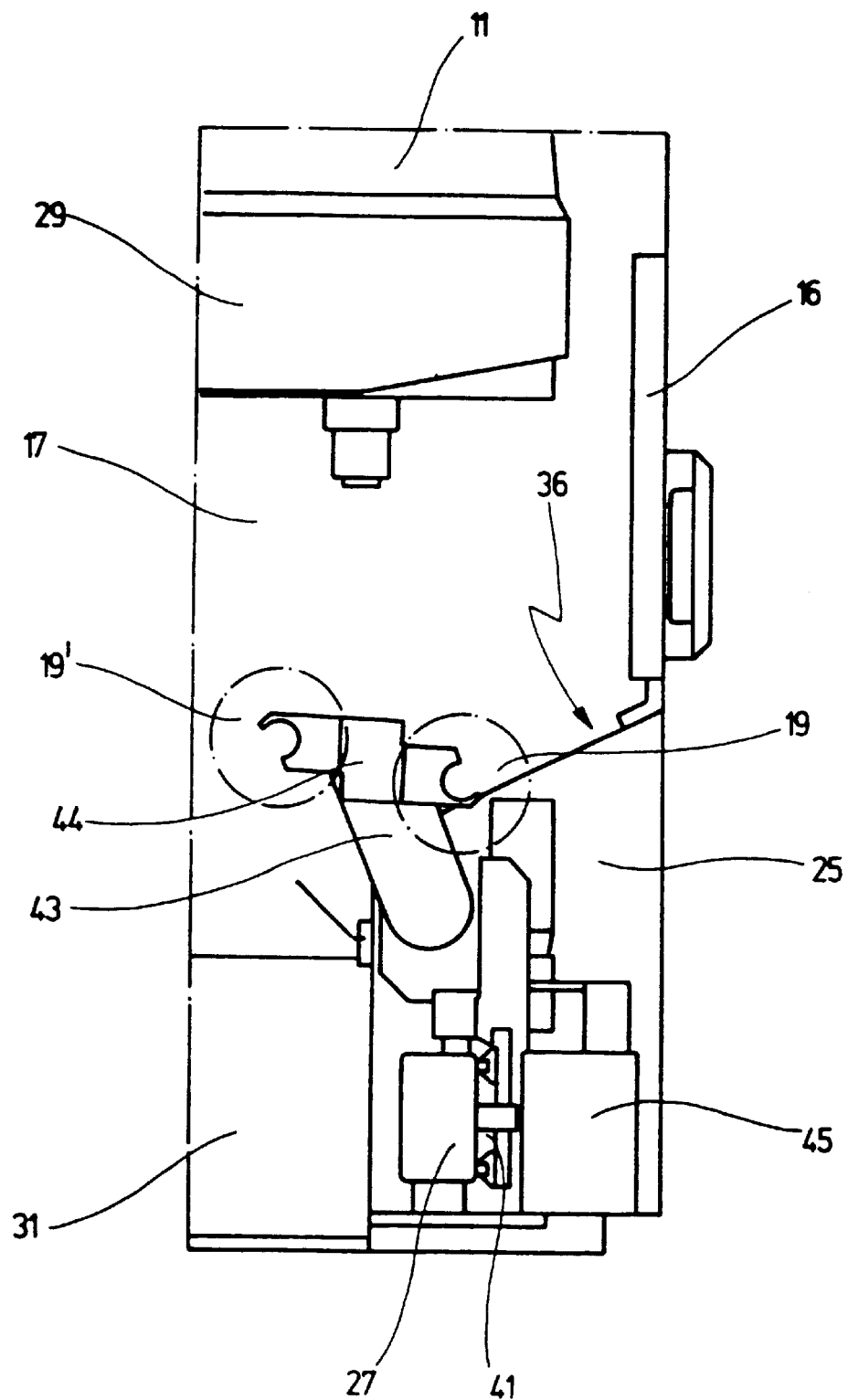
FIG. 4 shows a depiction like FIG. 3, but with the pivot arm swung out.

In the depiction of FIG. 4, which otherwise corresponds to FIG. 3, pivot arm 43 has been pivoted or extended through loading opening 36 into working space 17, where double gripper 44 has already gripped workpiece holder 19' which carries a workpiece that has already been machined by machine tool 11. Workpiece holder 19 and workpiece holder 19' are now exchanged by way of a pivoting movement through 180 degrees in the plane of FIG. 4, so that fixture holder 34 evident in FIG. 2 can pick up workpiece holder 19 with the workpiece that is yet to be machined. Pivot arm 43 is thereupon swung or pulled back in, so that it assumes the position shown in FIG. 3.

Lastly, cover 37 is closed so that machining of the new workpiece can be accomplished in working space 17 of machine tool 11, while loading device 26 brings workpiece holder 19' to a further machine tool or to loading/unloading station 18 and there exchanges it for a workpiece holder 19 that was equipped in clamping station 18 with a workpiece that is yet to be machined.

Figure 5:
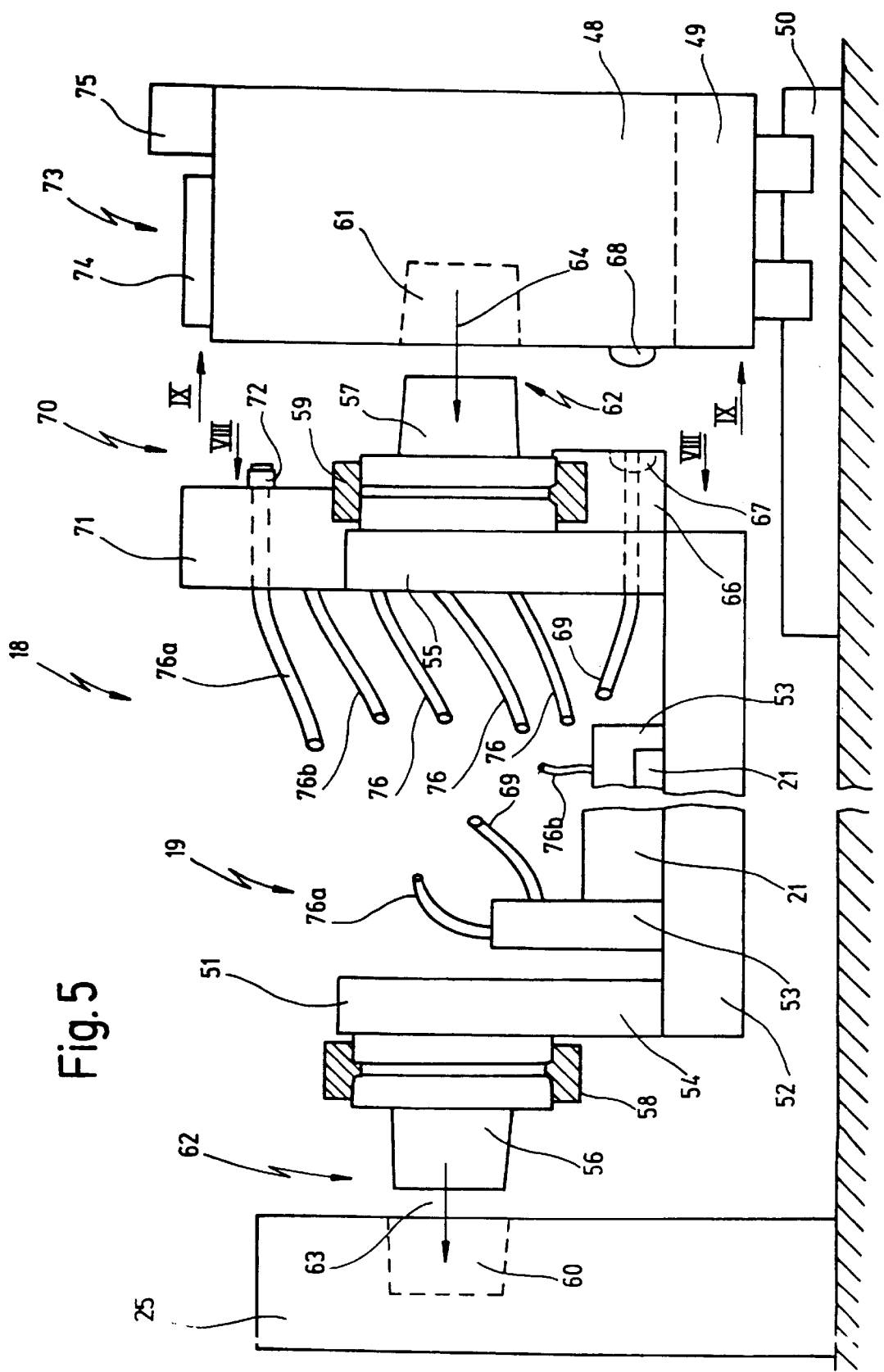
FIG. 5 shows, in an enlarged side view, the clamping station of the new machining center with a fixture which receives workpieces to be machined and can be clamped between a fixed and a movable buttress but is not carried by gripper hands.

In FIG. 5, clamping station 18 is shown in enlarged and more detailed fashion. Serving as workpiece holder 19 here, according to the present invention, is a fixture 51 similar to a cradle plate, which has on its bottom plate 52 self-locking clamping elements 53 in order to clamp in workpiece 21 (indicated schematically) at both ends. By way of the selection of the length and width of bottom plate 52, fixture 51 can receive workpieces 21 of any bulk, since because of clamping elements 53, preferably located opposite one another, even very heavy workpieces 21 can be held securely.

Fixture 51 furthermore has two end plates 54 and 55, each joined to bottom plate 52, on each of which a hollow shaft taper 56 and 57 known per se, having the usual gripper groove, is provided. Hollow shaft tapers 56, 57 of this kind are used, inter alia, as tool holders in automatic tool changing systems.

In FIG. 5, 58 and 59 schematically indicate two gripper hands which hold fixture 51 in accurately positioned fashion between fixed buttress 35 and movable buttress 48. A hollow shaft taper (HSK) receptacle 60 having the usual clamping set is provided on fixed buttress 35, an HSK receptacle 61 with the usual clamping set also being provided on movable buttress 48. Just like HSK receptacles 60 and 61, HSKs 56 and 57 serve as holding parts 62 by means of which fixture 51 is immovably clamped into clamping station 18. For this purpose, gripper hands 58, 59 move fixture 51 in the direction of an arrow 63 so that HSK 56 is clamped into HSK receptacle 60. Movable buttress 48 is thereupon moved by motor 49, on rails 50, to the left in the direction of an arrow 64, until HSK 57 is clamped in HSK receptacle 61.

Arranged beneath HSK 57 is a coupling module 66 which carries a coupling element 67 that coacts with a coupling element 68 on movable buttress 48 so that fluidic energy is delivered to fixture 51 via a line 69 to actuate clamping elements 53. By way of this fluidic energy, which is generally supplied on a hydraulic basis, workpieces 21 can be clamped into fixture 51 and released from it. Clamping elements 53 are self-locking, so that the position of workpiece 21 does not change while fixture 51 is being transported by loading device 26.

In addition to coupling module 66, which is used both in clamping station 18 and in the respective working space 17 of a respective machine tool 11, 12, or 13, fixture 51 also has a multiple coupling 70 which is used only in clamping station 18.

This multiple coupling 70 comprises a support plate 71, attached to end plate 55, on which multiple coupling elements 72 are provided, of which only one is shown schematically in the side view of FIG. 5.

Support plate 71 coacts with a docking system 73 which carries a carriage 74 that can be displaced to the left in FIG. 5 via a motor 75. Coupling elements, corresponding to coupling elements 72 and not visible in the depiction of FIG. 5, are provided on carriage 74.

Via multiple coupling 70, hoses 76 are supplied with compressed air which is used for pneumatic back-pressure metering. For example, hose 76a is connected to clamping element 53 and provides position monitoring for workpiece 21.

Multiple coupling 70 makes available functions for fixture 51 which concern correctly positioned clamping of workpieces 21 and are thus required only in clamping station 18. A movable buttress 48 is also provided in machine tools 11, 12, 13, but without a docking system 73.

Figure 6:
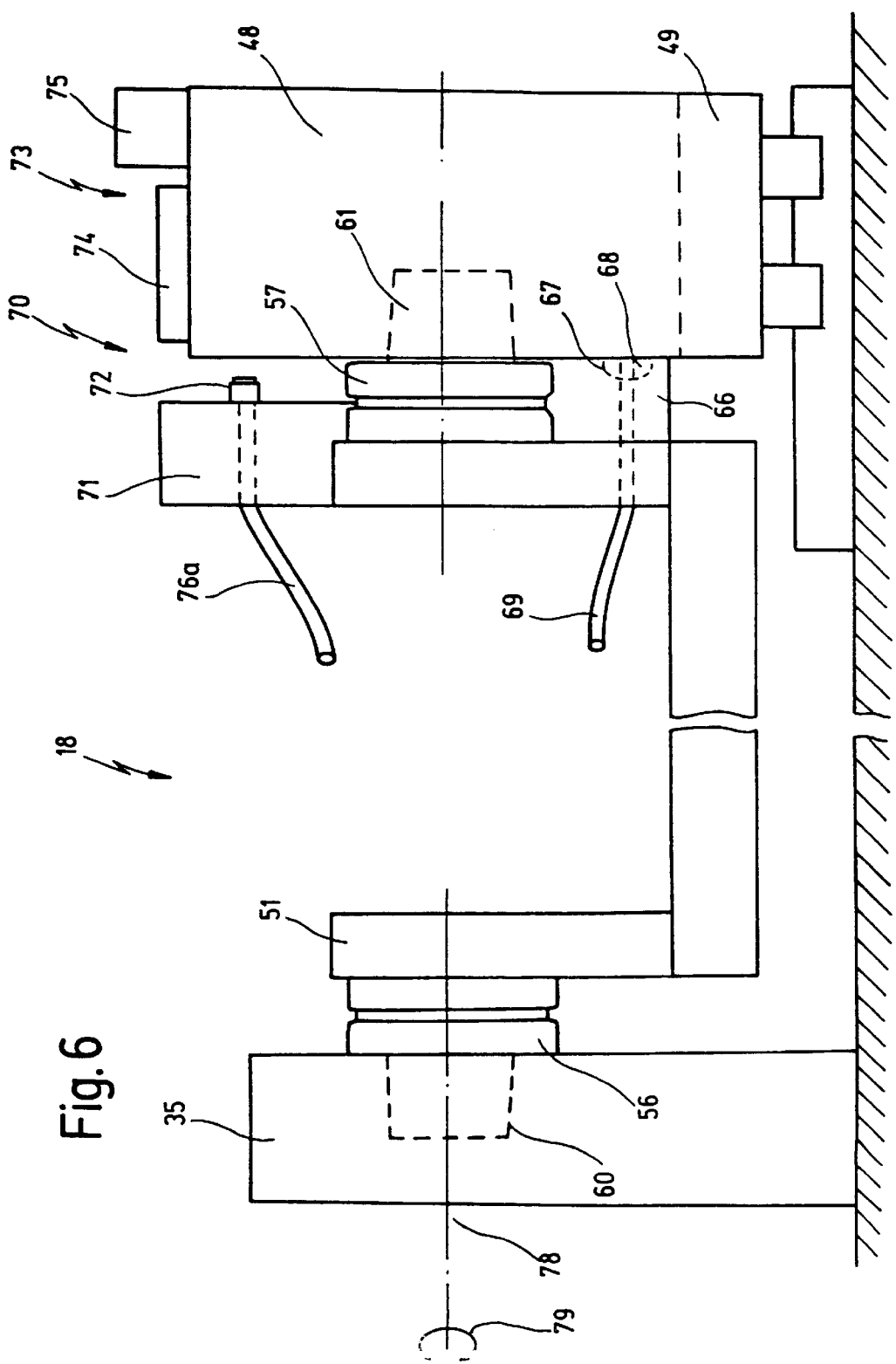
FIG. 6 shows a depiction like FIG. 5, but with the fixture clamped between the movable and the fixed buttress.

FIG. 6 shows, in a depiction like that of FIG. 5, the situation in which fixture 51 is clamped in immovably between fixed buttress 35 and movable buttress 48, but docking system 73 has not yet coupled on.

In this state, fixture 51 can pivot back and forth about its pivot axis 78 in the direction of a double arrow 79. Coupling module 66 that is already coupled in does not interfere with this, since it coacts with a rotary distributor on movable buttress 48, as will be explained later in connection with FIG. 9.

Pivoting of fixture 51 in clamping station 18 is necessary on the one hand so that fixture 51 can be flushed and blown clean from all sides, i.e. so that chips and adhering cutting fluid can be removed from a workpiece 21 that has already been machined. In addition, fixture 51 itself is also correspondingly cleaned after removal of the machined workpiece 21.

Fixture 51 is designed to carry even very bulky and/or heavy workpieces; depending on the geometrical arrangement, these workpieces can be removed from or inserted into a fixture 51 that has pivoted about pivot axis 56 out of the horizontal position shown in FIG. 6. For this workpiece change, however, clamping elements 53 shown in FIG. 5 must be capable of being actuated even in the tilted position, which is why the hydraulic power supply of hose 69 is provided via the rotary distributor already mentioned.

It may be noted here that a rotary distributor of this kind is also present in the machine tool. While the clamping force of the self-locking clamping elements 53 is great enough to ensure that workpiece 21 maintains its position while fixture 51 is being transported by loading device 26, the holding force is not, however, sufficient to hold workpiece 21 in position during machining. For this purpose, a hydraulic power supply is again provided via hoses 69. Since fixture 51 must be pivoted in the manner of a cradle plate during machining, movable buttress 48, which is provided in each machine tool 11, 12, 13, also contains a rotary distributor as described below in connection with FIG. 9.

Figure 7:
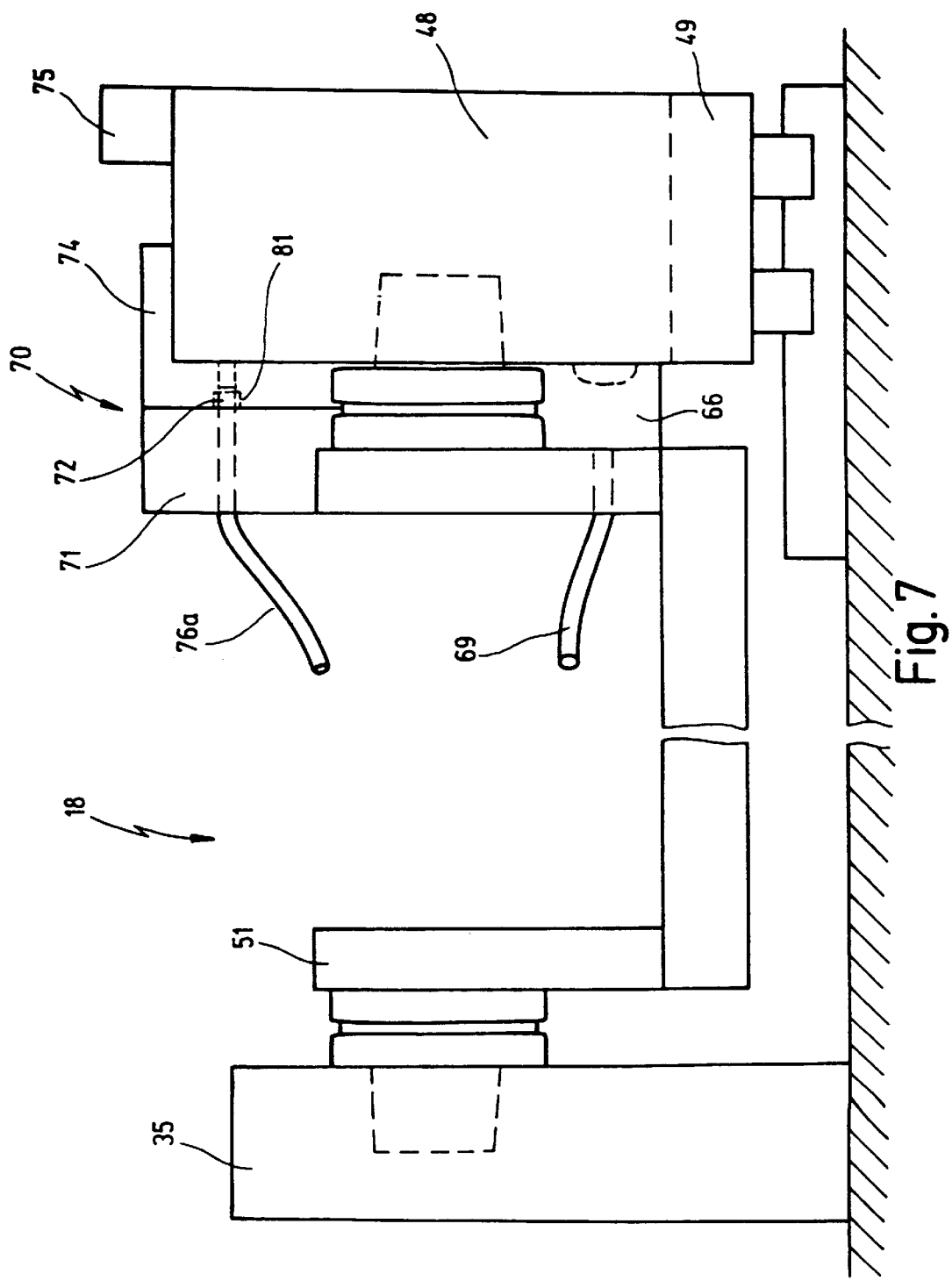

FIG. 7 shows, in a depiction like that of FIG. 6, a situation in which motor 75 has pushed carriage 74 of docking system 73 to the left, so that the coupling elements on carriage 74 now come into engagement with coupling elements 72 on support plate 71. One coupling element 81 is shown, by way of example, on carriage 74.

Figure 8:
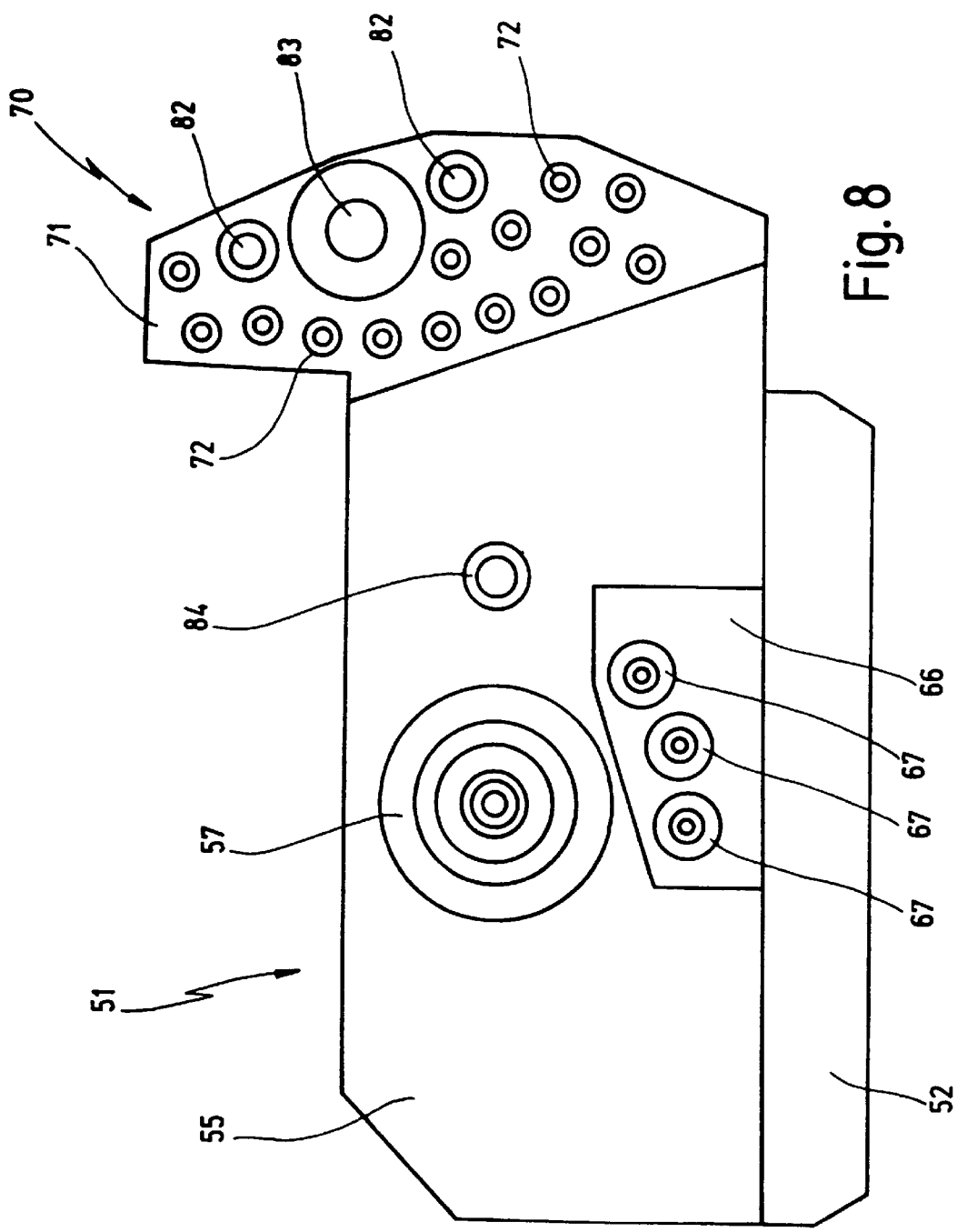
FIG. 8 shows a plan view of the end face of the fixture of FIG. 5 which faces toward the movable buttress, with a support plate for the multiple coupling.

FIG. 8 shows a plan view of end plate 55 of fixture 51 in the direction of arrow VIII of FIG. 5. It is evident that support plate 71 comprises a total of fourteen coupling elements 72 for icompressed air, two coupling elements 82 for hydraulics and one plug part 83 for a locking unit furthermore being provided.

Coupling module 66 beneath HSK 57 comprises three coupling elements 67 for hydraulics; these coupling elements 67 are also used in machine tools 11, 12, 13, while multiple coupling 70, as already mentioned several times, is utilized only in clamping station 18.

Also shown in addition to HSK 57, as the positioner part, is a centering pin 84 via which pivoting of fixture 51 and positionally accurate coupling are effected, in order to prevent shear forces on coupling elements 67.

Figure 9:
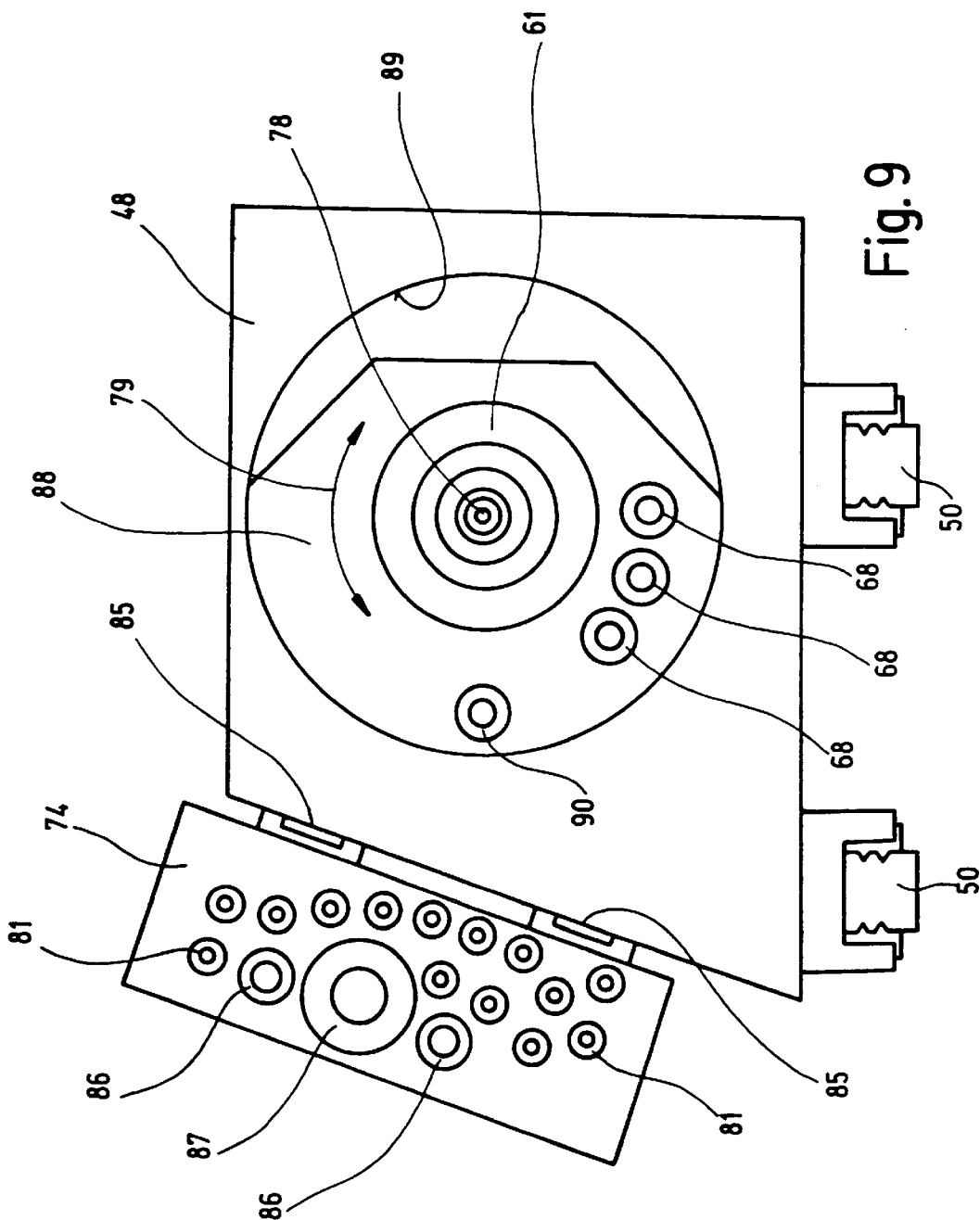
FIG. 9 shows a plan view of the movable buttress of FIG. 5 with the docking system.

FIG. 9 shows, in a manner complementary to FIG. 8, a plan view of movable buttress 48 in the direction of arrow IX of FIG. 5.

Carriage 74 is mounted via rails 85, displaceably perpendicular to the drawing plane of FIG. 9, on buttress 48 which is itself displaceable. FIG. 9 shows that carriage 74 carries coupling elements 86 for hydraulics that are complementary to coupling elements 82, as well as a socket part 87 which together with plug part 83 on support plate 71 constitutes a locking unit by means of which multiple coupling 70 is reliably positioned and locked when carriage 74 is moved toward support plate 71.

While carriage 74 is present only on movable buttress 48 in clamping station 18, the remainder of buttress 48 that will now be described corresponds to the one also used in machine tools 11, 12, 13.

Movable buttress 48 contains a rotary distributor plate 88 which is guided, pivotably in the direction of arrow 79, in a circular guide 89. In addition to HSK receptacle 61 and coupling elements 68 associated with coupling elements 67, rotary distributor plate 88 also carries, as positioner part, a receptacle 90 for centering pin 84 which is arranged on end plate 55.

By the coaction of HSK 57 and HSK receptacle 61 on the one hand, and of centering pin 84 and receptacle 90 on the other hand, fixture 51 is centered with reference to rotary distributor plate 88; when a rotation of rotary distributor plate 88 occurs about pivot axis 78, the pivot force is transferred via centering pin 84 and receptacle 90 to fixture 51, thus preventing shear forces on coupling elements 67, 68.

Docking system 73, which is displaceable independently of movable buttress 48, thus makes available in clamping station 18 fourteen pneumatic connectors as well as two further hydraulic connectors, through which, when fixture 51 is in the horizontal orientation shown in FIG. 5, 6, or 7, the latter can be supplied with further functions or inquiries. When docking system 73 is not docked on or not present, fixture 51 can be pivoted via rotary distributor plate 88, the necessary hydraulic connectors for releasing, closing, and holding clamping elements 53 being made available via coupling elements 67, 68.

Figure 10:
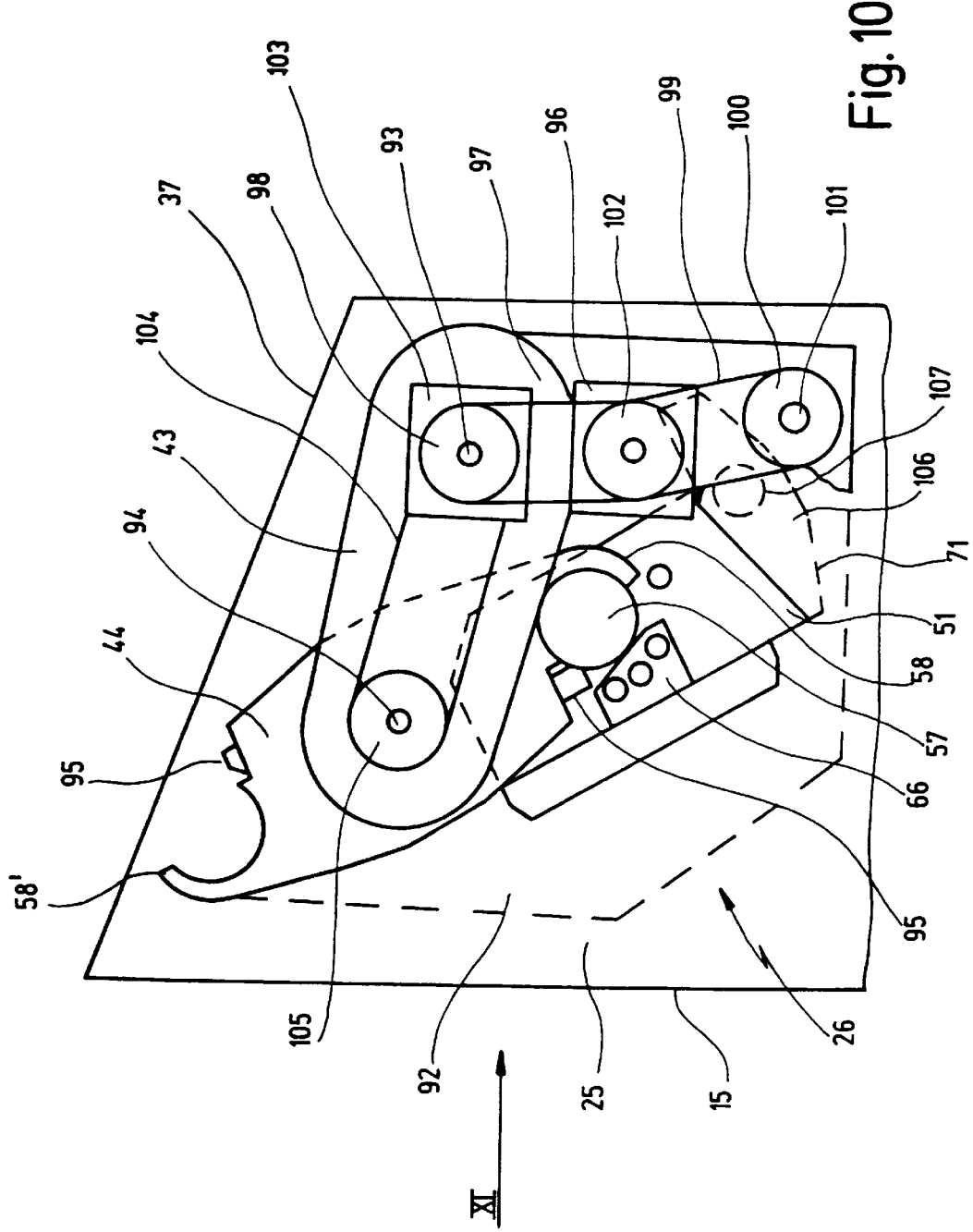
FIG. 10 shows a depiction of the upper region of the loading device with pivot arm and double gripper, in a depiction like FIG. 2, i.e. on the side facing the movable buttress.

FIG. 10 shows a fixture 51 which has been gripped by a loading device 26 and pivoted into loading space 25. FIG. 10 shows a plan view of fixture 51 which corresponds to the view of FIG. 8.

In the highly simplified depiction of an upper region of loading device 26, a support part 92 of loading device 26 is shown in truncated fashion and also simply with dashed lines, in order to make fixture 51 visible.

Mounted firstly on support part 92 is pivot arm 43, which can be pivoted about a pivot axis 93. Mounted at the other end of pivot arm 43, rotatably about a rotation axis 94, is double gripper 44 which comprises both gripper hand 58 that carries mechanism 51 and a free gripper hand 58'. A catch pawl 95, which in the case of gripper hand 58 is extended and holds HSK 57 in gripper hand 58, is provided on each gripper hand. On gripper hand 58', catch pawl 95 is retracted so that after pivot arm 43 has pivoted out and double gripper 44 has rotated correspondingly, this gripper hand 58' can remove a fixture from a working space of a machine tool.

The drive system required for this purpose comprises on the one hand a pivot motor 96 which drives, via a toothed belt 97, a gear 98 that is joined to pivot arm 43 and sits on pivot axis 93. Pivot motor 96 is moreover joined via a second toothed belt 99 to a gear 100 which sits nonrotatably on a coupling rod 101 via which, in a manner yet to be described, a pivot arm parallel to pivot arm 43 is driven separately. It may also be noted that pivot motor 96 of course has its own gear 102 on which the two toothed belts 97 and 99 are arranged next to one another.

Arranged concentrically in pivot axis 93 is a rotation motor 103 which drives, via a toothed belt 104, a gear 105 that is joined nonrotatably to double gripper 44. The arrangement of rotation motor 103 on pivot axis 93 makes it possible for double gripper 44 to be driven independently of the particular location of pivot arm 43.

FIG. 10 further shows that support plate 71 of fixture 51 is equipped with a cover 106 for covering purposes, associated with which is a handling system 107 (indicated only schematically).

Figure 11:
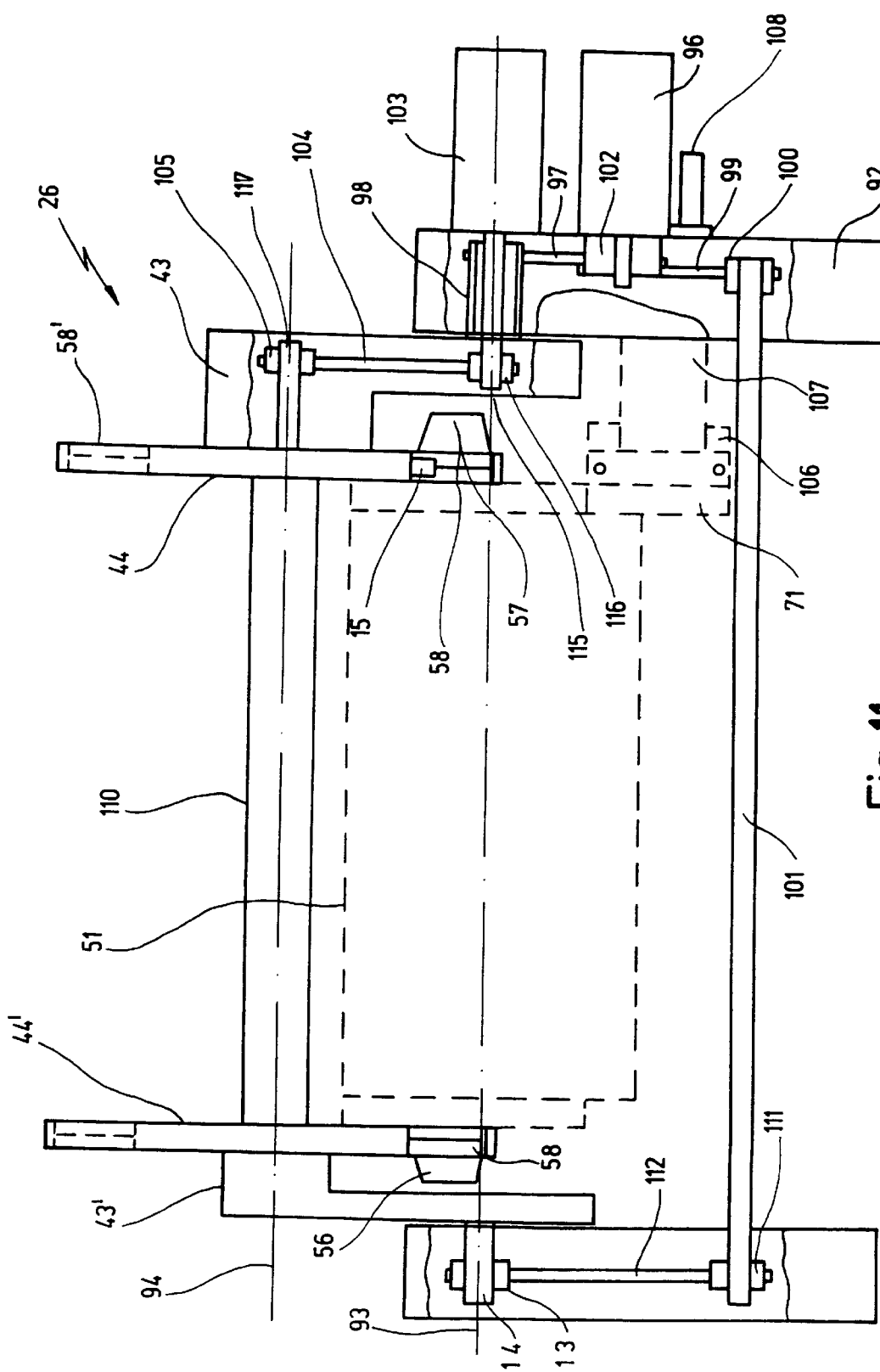
FIG. 11 shows, in a schematic depiction, a view of the loading device in the direction of arrow XI of FIG. 10.
Figure 12:
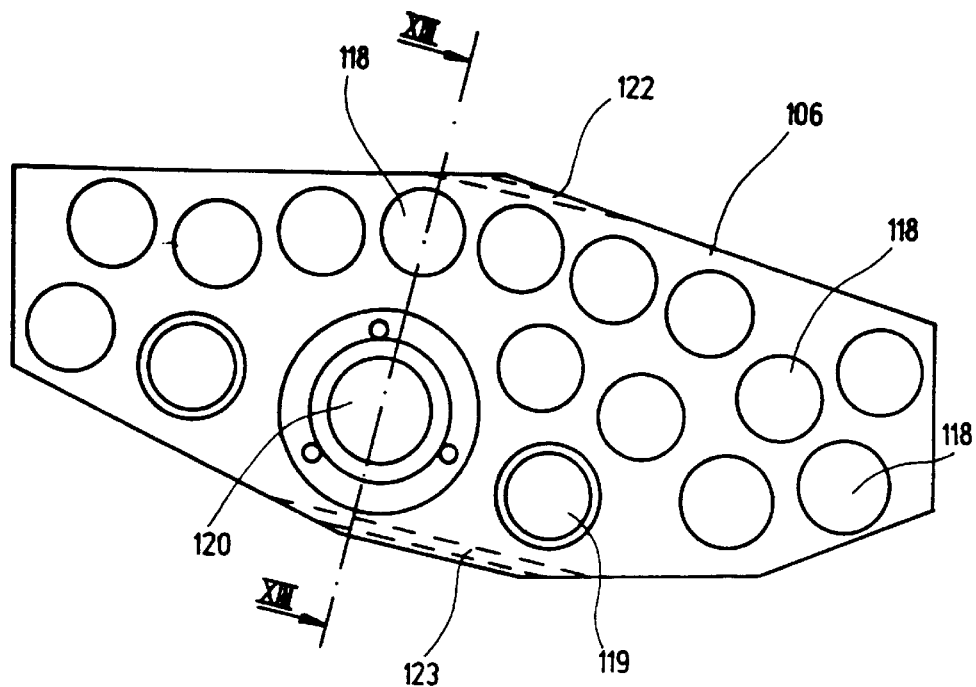
FIG. 12 shows a plan view of the cover of the fixture of FIG. 10.

In FIG. 11, which is a schematic view along arrow XI of FIG. 10, this handling system 107 is shown in more detail at lower right; it is evident there that a drive unit 108 for handling system 107 is attached on support part 92 of loading device 26. In the pivoted-in state, as shown in FIGS. 10 and 11, support plate 71 is located directly in front of handling system 107, so that the latter must only perform a linear movement in order to remove cover 106 or put it in place. The purpose of cover 106 and the function of handling system 107 will be explained below in connection with FIGS. 12 and 13.

It is evident from the upper part of FIG. 11 that a further double gripper 44' is provided parallel to double gripper 44, the two double grippers being at a distance from one another which allows them to grasp a fixture 51 with their respective gripper hands 58, 58' at HSKs 56, 57 provided for the purpose; catch pawl 95, shown only on double gripper 44, ensures that fixture 51 is held in lossproof fashion.

The two double grippers 44, 44' are nonrotatably joined to one another by way of a rigid shaft 110, so that, so to speak, both double grippers 44, 44' are driven, thus preventing any tilting of fixture 51 when double grippers 44, 44' are rotated about rotation axis 94.

The parallel double gripper 44' sits on a further pivot arm 43' which is arranged and driven parallel to pivot arm 43. This parallel drive is accomplished via coupling rod 101 on which, remote from gear 100, there sits a further gear 111 which is in engagement via a toothed belt 112 with a gear 113 that in turn is joined nonrotatably to a shaft 114 by means of which pivot arm 43' is rotatable.

It is also evident from the right side of FIG. 11 that rotation motor 103 extends with its motor shaft 115 through hollow gear 98. Motor shaft 115 carries at its outer end a gear 116 which is in engagement, via toothed belt 104, with gear 105 which in turn is joined nonrotatably to a shaft 117 which is attached on rigid shaft 110.

Pivot motor 96 thus drives both pivot arms 43, 43' synchronously, so that even with very heavy or bulky workpieces, fixture 51 can be pivoted quickly and reliably out of loading space 25 into working space 17 or into clamping station 18. As a result of the rigid connection between the two double grippers 44, 44' via shaft 110, rotation of double grippers 44, 44' is also accomplished synchronously, so that fixtures 51 can be changed very quickly. The result of this highly rigid system is to prevent the occurrence of vibrations during the pivoting and rotation of fixtures 51 because of the large masses being moved; these vibrations must be allowed to decay before fixture 51 can be clamped between fixed buttress 35 and movable buttress 48. Because these vibrations are absent, not only can the fixtures be exchanged more quickly, but workpieces 21, which are held only by the self-locking clamping elements 53 while fixtures 51 are being transported, are also held more securely in position, so that machining accuracy is increased in particular for those workpieces which must be machined successively by multiple machine tools 11, 12, 13. The position of workpieces 21 on fixture 51 does not change between the individual clampings in working spaces 17 of machine tools 11, 12, 13, since they are being moved very quickly but also without vibration or shock.

Lastly, FIG. 12 again shows cover 106, already known from FIGS. 10 and 11, for support plate 71, FIG. 12 being a plan view of the side of cover 106 facing toward support plate 71. Cover 106 has receiving orifices 118 for coupling elements 72, receiving orifices 119 for coupling elements 82, and a receiving orifice 120 for plug part 83 of the locking unit. Also provided on the upper and lower edges of cover 106 are holding grooves 122, 123 which come into engagement with jaws 124, 125 of handling system 107, as shown in FIG. 13.

Figure 13:
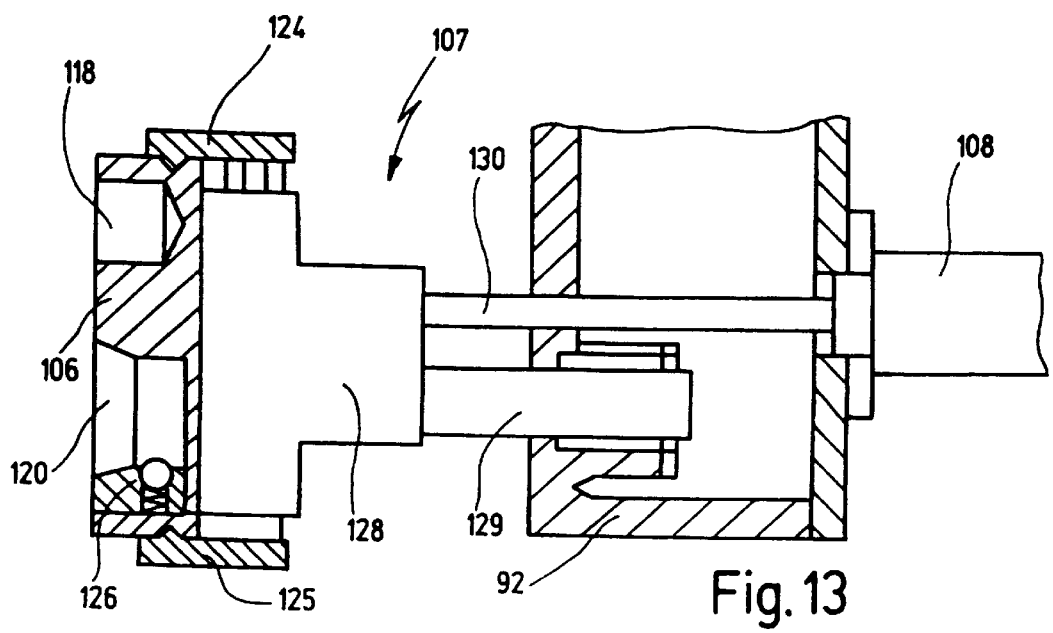
FIG. 13 shows a schematic side view of the handling system of FIG. 11.

It is evident from the sectioned depiction of FIG. 13 that at least one ball-spring catch 126, by way of which cover 106 snap-locks onto plug part 83, is provided in receiving orifice 120.

Jaws 124, 125 are attached to a pneumatically actuated gripper 128 of handling system 107, which in turn is guided displaceably, via a guide rod 129, on carrier part 92 of loading device 26. From drive unit 108, an actuation rod 130 passes into gripper 128. In a manner known per se, the arrangement is such that prior to an actuation of drive unit 108, jaws 124, 125 are first opened pneumatically, and then gripper 128 is pulled to the right in FIG. 13 via actuation rod 130; as a result, cover 106 is released and remains on support plate 71 when fixture 51 is pivoted into working space 17 of a machine tool 11, 12, 13. Cover 106 now protects multiple coupling 70 from soiling in working space 17 of a machine tool 11, 12, 13.

When fixture 51 is, on the other hand, to be pivoted into clamping station 18, cover 106 is pulled away from support plate 71 by handling system 107 even as loading device 26 is being displaced, so that when fixture 51 is pivoted into clamping station 18, multiple coupling 70 is exposed and docking system 73 can dock therein. Of course each fixture 51 has its own cover 106 associated with it, carried by handling system 107 only in clamping station 18. When fixture 51 has been loaded with a new workpiece and pivoted into loading space 25, handling system 107 places cover 106 back onto support plate 71 while loading device 26 is being displaced to the first machine tool 11, 12, 13, so that no additional machine time is required for setting cover 106 in place and removing it.

What is claimed is:

1. A machining center, comprising
a number of machine tools, each machine tool having a working space for machining workpieces clamped into workpiece holders;
a clamping station for clamping workpieces to be machined into said workpiece holder; and
a loading device moving between said clamping station and said machine tools for transporting workpiece holders from said clamping station to the working space of at least one of said machine tools and vice versa, said loading device having two pivot arms arranged parallel to one another for carrying said workpiece holders, said pivot arms being pivoted in during moving of said loading device and being pivoted at least partially about a pivot axis into the working space and to the clamping station, respectively, for workpiece changing,
each workpiece holder comprising a fixture for positionally accurate receiving of a workpiece, said fixture having a first and a second end face, each end face being equipped with a holding part via which holding parts said fixture is held in said clamping station and said working space, respectively,
for transporting said two pivot arms grasping said fixture at said holding parts such that said fixture is held between said pivot arms during transporting.

2. The machining center of claim 1, wherein a double gripper which grips the fixture at each holding part is rotatably mounted on each pivot arm.

3. The machining center of claim 2, wherein the holding parts comprise hollow shaft tapers and the double grippers grasp the hollow shaft tapers at their gripper grooves.

4. The machining center of claim 3, wherein one fixed and one movable buttress are provided in the clamping station and in each working space, each buttress having a hollow shaft taper receptacle in order to clamp the fixture between them.

5. The machining center of claim 4, wherein the fixture has, at least at one end face, a positioner part oriented parallel to the hollow-shaft taper which, when the fixture is clamped in between the buttresses, is in engagement with a further positioner part on one of the buttresses.

6. The machining center of claim 2, wherein the two double grippers are joined to one another via a rigid shaft, and a first of the double grippers is joined to a rotation motor.

7. The machining center of claim 1, wherein the two pivot arms are driven via a shared pivot motor.

8. The machining center of claim 6, wherein the two pivot arms are driven via a shared pivot motor.

9. The machining center of claim 8, wherein a rotatably mounted coupling rod which extends parallel to the rigid shaft is arranged between the pivot motor and a first of the pivot arms.

10. The machining center of claim 9, wherein the pivot motor is drivingly connected via a first toothed belt to a first gear joined to the first pivot arm, and via a second toothed belt to a second gear joined to the coupling rod, and the coupling rod has a third gear which is drivingly joined, via a third toothed belt, to a fourth gear which is joined to a second of the pivot arms.

11. The machining center of claim 10, wherein the rotation motor is arranged concentrically with the rotation axis, and is drivingly connected via a fourth toothed belt to a fifth gear that is joined to the first double gripper.

12. The machining center of claim 11, wherein the rotation motor has a motor shaft which extends through the first gear and carries at its free end a sixth gear which is in engagement with the fourth toothed belt.

13. The machining center of claim 1, wherein the fixture comprises self-locking clamping elements for clamping in the workpieces, a coupling module for supplying the clamping elements with fluidic energy, and a multiple coupling for transferring measurement signals, which multiple coupling is selectably docked in the clamping station.

14. The machining center of claim 13, wherein a cover for the multiple coupling is provided in order to protect its coupling elements from soiling in a working space.

15. The machining center of claim 14, wherein a handling system is provided for the cover.

16. The machining center of claim 15, wherein the handling system is arranged on the loading device.

17. The machining center of claim 4, wherein the fixture comprises self-locking clamping elements for clamping in the workpieces, a coupling module for supplying the clamping elements with fluidic energy, and a multiple coupling for transferring measurement signals, which multiple coupling is selectably docked in the clamping station.

18. The machining center of claim 17, wherein there is arranged on one of the two buttresses a rotary distributor which comprises coupling elements associated with the coupling module, a further positioner part associated with a positioner part arranged on the fixture, and a further holding part associated with a holding part.

19. The machining center of claim 18, wherein a docking mechanism is provided on one of the two buttresses, said docking mechanism having coupling elements and being associated with the multiple coupling and displaceable independently from the buttress in terms of opening and closing the multiple coupling.

* * * * *

UNITED STATES PATENT AND TRADEMARK OFFICE
CERTIFICATE OF CORRECTION

PATENT NO.    : 6,216,325 B1  
DATED         : April 17, 2001  
INVENTOR(S)   : Rudolf Haninger et al.

It is certified that error appears in the above-identified patent and that said Letters Patent is hereby corrected as shown below:

<u>Title page,</u>  
Item [30], Foreign Application Priority Data, "197 48 336" should read
-- 197 48 334 --.

Signed and Sealed this

Sixth Day of August, 2002

Attest:

JAMES E. ROGAN  
Attesting Officer     Director of the United States Patent and Trademark Office